United States Patent [19]
Groth et al.

[11] Patent Number: 6,054,553
[45] Date of Patent: *Apr. 25, 2000

[54] PROCESS FOR THE PREPARATION OF POLYMERS HAVING RECURRING AGENTS

[75] Inventors: Torsten Groth, Odenthal; Winfried Joentgen; Frank Döbert, both of Köln; Klaus-Peter Heise, Odenthal; Thomas Menzel, Hilden; Ursula Pentling, Duisburg; Hans-Georg Pirkl, Köln; Paul Wagner, Düsseldorf; Joergen Weinschenck, Krefeld, all of Germany

[73] Assignee: Bayer AG, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,812

[22] Filed: Nov. 12, 1996

[30] Foreign Application Priority Data

Jan. 29, 1996 [DE] Germany .............................. 196 03 053
Jan. 29, 1996 [DE] Germany .............................. 196 03 052

[51] Int. Cl.$^7$ ...................................................... C08G 69/26
[52] U.S. Cl. .......................... 528/335; 528/336; 528/363; 528/492; 528/503
[58] Field of Search .................................... 528/328, 332, 528/363, 492, 503, 335, 336

[56] References Cited

U.S. PATENT DOCUMENTS

| | | | |
|---|---|---|---|
| 4,590,260 | 5/1986 | Harada et al. | 528/328 |
| 4,696,981 | 9/1987 | Harada et al. | 525/328.2 |
| 4,839,461 | 6/1989 | Boehmke | 528/363 |
| 5,288,783 | 2/1994 | Wood | 525/418 |
| 5,459,234 | 10/1995 | Bortnick et al. | 528/363 |
| 5,530,091 | 6/1996 | Wagner et al. | 528/328 |
| 5,610,255 | 3/1997 | Groth et al. | 526/304 |

FOREIGN PATENT DOCUMENTS

| | | |
|---|---|---|
| 0 612 784 | 8/1994 | European Pat. Off. . |
| 0 625 531 | 11/1994 | European Pat. Off. . |
| 0 693 516 | 1/1996 | European Pat. Off. . |
| 43 05 368 | 8/1994 | Germany . |
| WO 95/20617 | 8/1995 | WIPO . |

OTHER PUBLICATIONS

Orbit Abstract of DE 43 05 368 (Aug. 25, 1994).
Orbit Abstract of EP 0 612 784 (Aug. 31, 1994).
Orbit Abstract of EP 0 693 516 (Jan. 24, 1996).

*Primary Examiner*—Duc Truong
*Attorney, Agent, or Firm*—Connolly Bove Lodge & Hutz LLP

[57] ABSTRACT

Polymers having recurring succinyl units are obtained by an improved process by reaction of A, an unsaturated $C_4$-dicarboxylic acid or a derivative thereof, with B, a nitrogen-donating compound, in a first reaction step to give a reaction mixture comprising at least one low molecular weight reaction product, and subsequent continuous feeding of the reaction mixture into a continuously operated reactor to give the polymer in a second reaction step. In a further embodiment the invention refers to polymers having recurring succinyl units prepared by reaction of an unsaturated $C_4$-dicarboxylic acid or a derivative thereof with a nitrogen-donating compound in a first reaction step and subsequent feeding of the reaction mixture, without intermediate isolation, into an optionally continuously operated reactor, with removal of water, and treatment of the reaction mixture at a temperature of 140 to 350° C.

38 Claims, No Drawings

PROCESS FOR THE PREPARATION OF POLYMERS HAVING RECURRING AGENTS

The invention relates to a process for the preparation of polymers having recurring succinyl units.

The polymers thus prepared can be hydrolyzed by organic and inorganic bases to give the corresponding derivatives.

The preparation of polymers containing succinyl units, in particular polyaspartic acids and polysuccinimide, has been the subject of intensive research for some years.

U.S. Pat. No. 4,839,461 (=EP-A 0,256,366) describes the preparation of polyaspartic acid from maleic anhydride, water and ammonia. It is known from U.S. Pat. No. 4,590,260 that amino acids can be subjected to polycondensation together with derivatives of malic, maleic and/or fumaric acid at 100 to 225° C. According to U.S. Pat. No. 4,696,981, microwaves can be employed for carrying out such a reaction.

U.S. Pat. No. 5,288,783 describes the preparation of polyaspartic acid from maleic acid or fumaric acid, water and ammonia at temperatures of 190 to 350° C. and at temperatures of 160 to 200° C. by extrusion. The polysuccinimide prepared by one of the two process routes is then hydrolyzed under alkaline conditions to give polyaspartic acid.

EP-A 0 625 531 describes a continuous process for the preparation of polymers from monoethylenically unsaturated acids or anhydrides and a nitrogen-containing component, it being possible for a fluidizing agent to be present.

The present invention relates to a process for the preparation of polymers having recurring succinyl units by reaction of A, an unsaturated $C_4$-dicarboxylic acid or a derivative thereof, with B, a nitrogen-donating compound, in a first reaction step to give a reaction mixture comprising at least one low molecular weight reaction product of A and B and/or a prepolymer of A and B, preferably having a molecular weight $M_W<1300$, and subsequent continuous feeding of the reaction mixture into a continuously operating reactor and treatment of the reaction mixture at a temperature of 140 to 350° C. to give the polymer having recurring succinyl units and a molecular weight $M_W>1300$ in a second reaction step.

Preferred compounds A are maleic anhydride, maleic acid and fumaric acid. They can be employed individually or as a mixture.

Preferred compounds B are ammonia or compounds which liberate ammonia, in particular ammonium salts and amides of carbonic acid, such as, for example, ammonium bicarbonate, diammonium carbonate, urea, isourea (ammonium cyanate), carbamic acid or ammonium carbonate. Other organic and inorganic ammonium salts can also likewise be employed. These precursors can be employed individually or as mixtures in bulk or solution. If ammonia is employed as precursor B, this can also be used in gaseous form.

The reaction mixtures are preferably prepared either by reaction of maleic anhydride with ammonia or ammonia derivatives or by reaction of maleic anhydride first with water to give maleic acid, and subsequent reaction with ammonia and ammonia derivatives.

In a preferred embodiment, maleic anhydride is reacted with ammonia or ammonia derivatives. Suitable solvents can be used in this reaction. Water is preferably to be employed.

Depending on the conditions under which the reaction is carried out, maleic anhydride secondary derivatives are formed, such as, for example, maleamic acid, maleamic acid ammonium salt, maleic acid monoammonium salt, maleic acid diammonium salt, aspartic acid, aspartic acid monoammonium salt, aspartic acid diammonium salt, iminodisuccinate mono-, di-, tri- or tetraammonium salt, asparagine, asparagine ammonium salt, iminodisuccinatediamide diammonium salt and condensation products resulting therefrom. In the presence of water, the corresponding ammonium salts are also formed by hydrolysis of the acid amides.

In another preferred embodiment, maleic anhydride is first reacted with water to give maleic acid, which then reacts with ammonia or ammonia derivatives in aqueous solution to give a reaction mixture.

According to the invention, reaction mixtures which can additionally comprise the corresponding fumaric acid derivatives and malic acid derivatives can also be formed. Furthermore, all components containing amino groups can occur in condensed form with the other components containing carboxylic acid to form peptide bonds.

Maleic anhydride and derivatives thereof are preferably employed as precursor A in amounts such that the molar ratio of nitrogen in precursor B in relation to the maleic anhydride or a derivative thereof in precursor A is between 0.1 and 25, preferably between 0.5 and 8 and especially preferably between 0.9 and 4.

The first reaction step is a rapid, highly exothermic reaction, as a result of which product damage may arise in the case of a non-specific reaction procedure, for example by a severe increase in temperature. According to the invention, however, a controlled temperature program can be ensured under preferably constant reaction conditions in order to prepare a desired reaction mixture. Preferred reaction conditions are temperatures between 60 and 250° C., in particular 70 to 170° C. and particularly preferably 80 to 150° C. The residence times can vary, in particular, between 1 minute and 20 hours and are preferably 2 minutes to 3 hours. The pressures are established specifically as a function of the reaction procedure and/or the temperature. If appropriate, the pressure can be established by addition of inert gas.

All reactors which allow good regulation of the reaction conditions are suitable in particular for carrying out the first reaction step. It is advantageous to carry out the reaction in discontinuously operating apparatuses which can provide an adequate residence time. In this case, the reaction volume can be used to dilute the precursor streams and therefore reduce the rate of reaction and nevertheless realize a sufficient reaction temperature which allows the formation of the desired intermediate products. Preferred reactors are all types of stirred tank reactors with and without pumped circulation, stirred tank cascades, loop reactors, tube reactors with recycling and the like. If gaseous ammonia is used, examples of reactors which may be mentioned are: bubble columns, gassed stirred tanks and airlift loop reactors.

The first reaction step is preferably carried out in a discontinuous stirred tank. In this case, one of the precursors A or B can be initially introduced, if appropriate in a solvent, and the other precursor can be added. In another embodiment, the precursors A and B are fed simultaneously to a discontinuous reactor (semi-batch procedure). If appropriate, the precursors are fed to the discontinuous reactor in premixed form. All types of mixers can be employed here. For example, these can be jet mixers, such as, for example, nozzle mixers, static mixers or dynamic mixers.

If gaseous ammonia is used, this is preferably fed to the reactor via suitable gas distributors. All types of static gas distributors (for example perforated plate, sintering plate, annular gassing unit, gassing lance and the like) and dynamic gas distributors (for example injectors, ejectors, gassing stirrers and the like) are conceivable. The gaseous ammonia feed can also be effected in a pumped circulation using suitable in-line mixers (nozzles, static mixers, injectors, ejectors).

When metering into the reactor has been concluded, the reaction mixture can either be polymerized directly or, preferably, heated up to the desired reaction temperature and kept at the reaction temperature for a certain time. The reactor is as a rule kept under pressure here. This prevents the solvent and/or any water of reaction formed from evaporating out of the reaction mixture. In another embodiment, the solvent and/or any water of reaction formed are evaporated off in a specific manner by controlling the pressure, in order to control the temperature and/or the properties of the reaction mixture in a specific manner.

The complex reaction mixtures obtained in the first discontinuous reaction step have not yet been described for preparation of polymers having recurring succinyl units. They differ from the known starting products for the preparation of polyaspartic acid by their complex composition. Above all, the amino group of aspartic acid necessary for building up poly-peptides is blocked in the iminodisuccinates by addition of a further $C_4$ unit. It was therefore not obvious that such compounds or mixtures comprising these compounds are suitable for building up polymers.

The reaction mixture produced in the first reaction step, which also includes mixtures of various previously prepared reaction mixtures and, where appropriate, mixtures of a reaction mixture or various reaction mixtures with the precursors A and/or B, is subjected to thermal polymerization in a suitable apparatus in the second reaction step to give the desired product. The choice of reaction mixtures here depends on the desired product quality for the various fields of use of the products. In a preferred embodiment, several discontinuous reactors for the first reaction step are operated in parallel with the reactor for the continuing thermal polymerization in one plant. A high degree of flexibility of the production plant is achieved in this way.

All apparatuses which provide the necessary minimum residence time for the polymerization, coupled with a narrow residence time distribution of the viscous-liquid phase, and allow the necessary temperature program and at the same time at least partial evaporation of the solvent, in particular the water, and of the water formed during the reaction are preferably suitable for the thermal polymerization.

Furthermore, for building up polymer chains of uniform chain length, the thermal polymerization should be carried out as far as possible in a residence time which is the same for all molecules under reaction conditions which are as identical as possible. Suitable reactors having a narrow residence time spectrum are known in the relevant literature (for example Ullmann: Encyclopedia of Industrial Chemistry, 1992, Volume B4, 97–120).

Preferred devices for the thermal polymerization are thus all apparatuses which have a defined residence time with a narrow residence time distribution for the solid or highly viscous liquid phase and at the same time allow good temperature control by at least partial evaporation of the solvent and/or of the water of reaction formed during the polymerization. Such preferred devices can be, for example, a) Tube reactors O. Levenspiel The Chemical Reactor Omnibook OSU Book Stores Inc. Corrallis Oregon January 1989, Chapters 3–5
b) High viscosity reactors with movable baffles, preferably a screw or List reactor, such as are described in EP-A 0 612 784 A1.
c) Driers (for example paddle driers or spray driers), preferably such as are described in DE-A4 425 952.
d) Stirred tank cascades, in particular such as are described by Levenspiel (see above).
e) Thin film evaporators, in particular such as are described by W. L. McCade, J. C. Smith, Unit operations of chemical engineering, McGrace Hill, 2nd edition, 1967, Chapter 16, page 445.
f) High viscosity reactors without movable baffles (for example multi-phase helical tube reactors (MPHR)), in particular such as are described in DT 1 667 051 and DE 219 967.
g) Microwave reactors, in particular such as are described in U.S. Pat. No. 4,696,981.

Combinations of these devices are possible, too.

Particularly good results are achieved if a tube reactor or an MPHR has been used. These apparatuses have proved particularly suitable for carrying out the process according to the invention.

To control the reactor temperature of the reactions carried out, complete or also partial circulation of the reaction mixture in combination with removal and supply of heat can be effected. All the reactors of the abovementioned construction with recycling of the reaction mixture in combination with removal and supply of heat and all loop reactors are particularly suitable for such a reaction procedure.

In a preferred embodiment, for the desired reaction procedure a reaction mixture produced in the first reaction step or mixtures of various previously prepared reaction mixtures and, where appropriate, mixtures of a reaction mixture or various prepolymers with the precursors A and/or B or one precursor component A and/or B or a solvent can be metered in at several points in a suitable manner along the tube or multiphase helical tube reactor, so that an optimum temperature profile and optimum product properties can be achieved. The number of metering points is preferably in the range of up to 10. The type of feeding is chosen such that good mixing with the reaction solution takes place.

The prepolymer produced in the first reaction step or mixtures of various previously prepared prepolymers or, where appropriate, mixtures of a prepolymer or various prepolymers with the precursors A and/or B are fed into the polymerization reactor at temperatures between 50° C. and 270° C., depending on the substances used. The removal or supply of heat to the reactor is controlled such that the second reaction step can then take place at 120 to 350° C., preferably at 140 to 300° C. and particularly preferably at 140 to 270° C., depending on the nature and concentration of the substances used. The temperature is advantageously established via the pressure in the reactor and the mass flows of the prepolymer produced in the first reaction step and fed in or mixtures of various previously prepared prepolymers or, where appropriate, mixtures of a prepolymer or various prepolymers with the precursors A and/or B, and the content of solvent. Product-precursor ranges with different temperatures can furthermore be brought into contact directly or indirectly in the reaction system for the purpose of heat exchange.

The residence times in the reactor system to be used for the second reaction step are up to 120 minutes. Residence times of up to 30 minutes are preferred. Residence times which decrease with increasing temperature are particularly preferred, i.e. less than 30 minutes at temperatures between 120 and 200° C.; less than 10 minutes at temperatures between 200 and 250° C.; less than 5 minutes at temperatures between 250 and 300° C.; and less than 2 minutes at temperatures above 300° C. The residence time is preferably chosen such that virtually complete polymerization takes place. The resulting reaction products are hot solutions or solvent-containing or aqueous melts, depending on the water or solvent content, because of the enthalpy of reaction liberated and the removal or supply of heat.

The polymers prepared by the process according to the invention contain recurring succinyl units having at least one of the following structures:

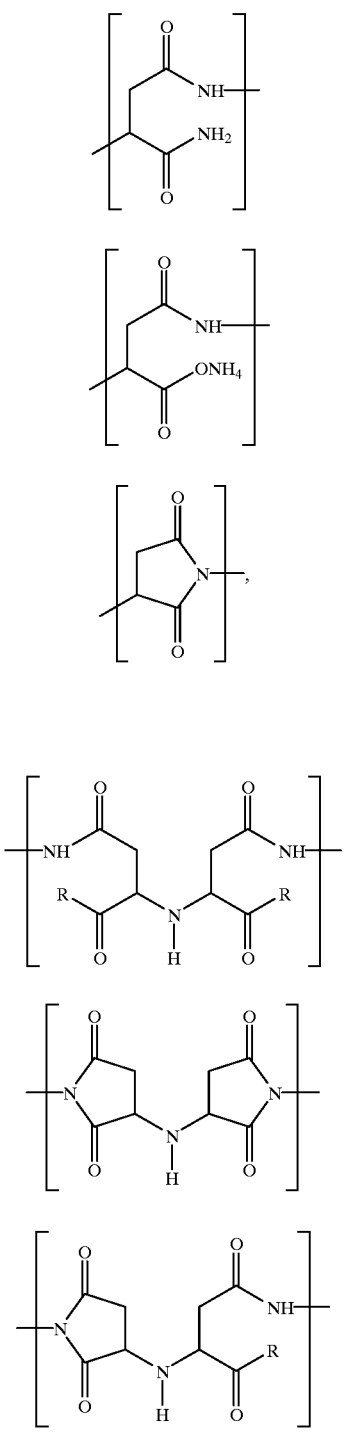

R=$ONH_4$, $NH_2$ or the structures 1, 2, 3, 4, 5 and 6.

In general, the polymers chiefly contain recurring units 1, 2 and 3.

In addition, by a suitable reaction procedure and choice of precursors, the polymers can contain other recurring units, for example a) malic acid units of the formula

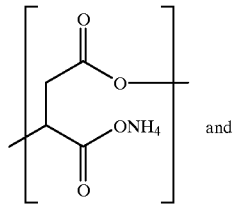

b) maleic acid and fumaric acid units of the formula

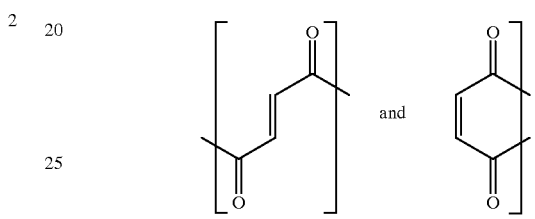

The chemical structure is preferably analyzed by $^{13}C$-NMR, FT-IR and, after total hydrolysis, by HPLC, GC and GC/MS.

According to a further development of the invention, the structure of the resulting polysuccinimide can be influenced by the stoichiometric ratio of the precursors.

The polymerization products can be solvolyzed. Suitable reaction partners are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like. Hydrolysis at a pH of 7 to 12 is preferred here.

The resulting products contain recurring aspartic acid units which, in the form of the free acid, correspond to the following formulae:

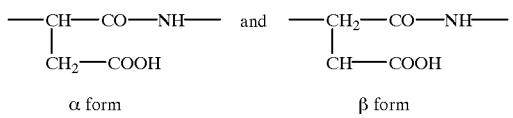

α form    β form

If the polymer is built up entirely or essentially from these recurring units, it is a polyaspartic acid.

In general, the content of the β form is more than 50%, preferably more than 70%.

The temperature during the hydrolysis is suitably in a range including up to the boiling point of the polymer suspension, and preferably 20 to 150° C. If appropriate, the hydrolysis is carried out under pressure. A salt is as a rule obtained here.

However, it is also possible to obtain free acids by purely aqueous hydrolysis or treatment of the salt with acids or acid ion exchangers.

Different chain lengths or molecular weights can be established, depending on the reaction conditions, for example residence time and temperature of the polymerization. According to analyses by gel permeation chromatography, molecular weights of Mw=1300 to 10,000, preferably 1300 to 5000, particularly preferably 1300 to 4500, are obtained in particular.

The polymers prepared according to the invention can be used in non-hydrolyzed or, preferably, in hydrolyzed form as an additive in low-phosphate and phosphate-free detergents and cleaning compositions. They are builders for detergents and have the effect of reducing encrustation and graying on the washed textile goods during the washing operation.

The polymers prepared according to the invention are furthermore suitable as water treatment agents. They can be added to the water in cooling circulations, evaporators or sea-water desalination plants. They can furthermore be employed as agents for preventing deposits during concentration of sugar cane juice.

They are furthermore suitable as a dispersing agent, bleaching agent stabilizer and corrosion inhibitor, for dispersing organic and inorganic pigments, as an additive in fertilizers and as a grinding auxiliary.

Because of their good dispersing properties, the polymers according to the invention are also suitable as dispersing agents for inorganic pigments and for the preparation of highly concentrated solids dispersions (slurries) of, for example, alkaline earth metal hydroxides, such as, for example, $Ca(OH)_2$ and $Mg(OH)_2$, or also their oxides and carbonates, and as an additive for cement or as a cement liquefier.

The invention furthermore relates to a process for the preparation of modified polymers in which a) 0.1 to 99.9 mol % of precursors A and B and b) 99.9 to 0.1 mol % of fatty acids, fatty acid amides, polybasic carboxylic acids, anhydrides and amides thereof, polybasic hydroxycarboxylic acids, anhydrides and amides thereof, polyhydroxycarboxylic acids, aminocarboxylic acids, sugar-carboxylic acids, alcohols, polyols, amines, polyamines, alkoxylated alcohols and amines, amino-alcohols, amino-sugars, carbohydrates, ethylenically unsaturated mono- and polycarboxylic acids and anhydrides and amides thereof, protein hydrolysates, for example maize protein hydrolysate and soya protein hydrolysate, aminosulfonic acids and aminophosphonic acids are reacted by the process according to the invention.

The precursors A and B described under a) are employed in the polymerization according to the invention to the extent of 0.1 to 99.9 mol %, preferably to the extent of 60 to 99.9 mol % and particularly preferably to the extent of 75 to 99.9 mol %.

Possible components (b) of the polymers are all the fatty acids. They can be saturated or ethylenically unsaturated. Examples are formic acid, acetic acid, propionic acid, butyric acid, lauric acid, palmitic acid, stearic acid, oleic acid, linoleic acid, linolenic acid, sorbic acid, myristic acid, undecanoic acid and all the naturally occurring fatty acid mixtures, for example $C_{12}/C_{14}$- or $C_{16}/C_{18}$-fatty acid mixtures. Acrylic acid and methacrylic acid can also be employed as unsaturated fatty acids.

These acids can furthermore also be used in the form of their amides. Polybasic carboxylic acids which can be employed are, for example, oxalic acid, succinic acid, glutaric acid, adipic acid, malonic acid, suberic acid, aconitic acid, itaconic acid, sulfosuccinic acid, alkenylsuccinic acid ($C_1$–$C_{26}$), 1,2,3-propanetricarboxylic acid, butanetetracarboxylic acid, furandicarboxylic acid and pyridinedicarboxylic acid. The anhydrides of polybasic carboxylic acids, for example succinic anhydride, itaconic anhydride, aconitic anhydride and phthalic anhydride, can likewise be used. Possible components (b) are furthermore also polybasic hydroxycarboxylic acids and polyhydroxycarboxylic acids. In addition to at least one hydroxyl group, polybasic hydroxycarboxylic acids carry at least two or more carboxyl groups. Examples which are mentioned here are malic acid, tartaric acid, uvic acid, citric acid and isocitric acid.

In addition to one carboxylic acid group, monobasic polyhydroxycarboxylic acids carry two or more hydroxyl groups, for example glyceric acid, dimethylolpropionic acid, dimethylolbutyric acid and gluconic acid. Monohydric alcohols having, for example, 1 to 22 C atoms, such as, for example, methanol, ethanol, n-propanol, i-propanol, butanol, pentanol, hexanol, octanol, lauryl alcohol, stearyl alcohol and the like are furthermore suitable. The alcohols can also optionally contain a double bond, such as allyl alcohol or oleyl alcohol. These alcohols can furthermore be alkoxylated, for example with ethylene oxide or propylene oxide. The adducts of 3 to 50 mol of ethylene oxide on fatty alcohols or oxo alcohols are, in particular, of industrial interest. Polyols which are either saturated or unsaturated can furthermore be employed as component (b), such as, for example, ethylene glycol, propylene glycol, butanediol, butenediol, glycerol, trimethylolpropane, pentaerythritol, sorbitol and neopentylglycol, as well as alkoxylated polyols, such as polyethylene glycols, polypropylene glycols, ethoxylated trimethylolpropane, glycerol or pentaerythritol having molecular weights of up to 6000. Comonomers (b) which are furthermore suitable are also amines, such as $C_1$–$C_{22}$-alkylamines, for example methylamine, ethylamine, propylamine, butylamine, cyclohexylamine, octylamine, isooctylamine (ethylhexylamine), stearylamine, allylamine, oleylamine, ethylenediamine, diethylenetriamine, hexamethylenediamine, piperazine, diaminobutane, dimethylamine, diethylamine, hydroxylamine, hydrazine, ethanolamine, diethanolamine and aminopropanediol, and polyalkyleneamines, such as polyethyleneamine having molecular weights of up to 6000. The amines can also be alkoxylated, for example the addition products of 3 to 30 mol of ethylene oxide on fatty amines, such as oleylamine, palmitylamine or stearylamine. Amino-sugars, such as aminosorbitol or chitosamine, are furthermore also suitable. Carbohydrates, such as glucose, sucrose, maltose, dextrins, starch, or sugar-carboxylic acids, for example mucic acid, gluconic acid, glucuronic acid or glucaric acid, are also suitable as component (b). Amino acids, proteinogens, such as glycine, alanine, glutamic acid and lysine, or non-proteinogens, such as 4-aminobutyric acid, diaminosuccinic acid, 11-aminoundecanoic acid and 6-aminocaproic acid, can furthermore be employed as component (b). The compounds of component (b) are employed for the polymerization in amounts of 0.1 to 99.9 mol %, preferably 0.1 to 40 mol %, particularly preferably 0.1 to 25 mol %. It is possible to employ a single compound of component (b) or mixtures of two or more compounds of (b). The compounds of component (b) can be mixed with one of the main precursors (a) in the desired ratio and employed as a mixture in the first reaction stage.

In another embodiment, the compounds of component (b) are added to the reaction mixture when carrying out the second reaction step on entry into the reactor for the thermal polymerization. It is likewise possible to meter in the compounds of component (b) simultaneously with the main precursors (a) in the first reaction step.

If monofunctional compounds such as alcohols, amines, fatty acids or fatty acid amides are used as component (b), they are incorporated at the chain end. They act as chain terminators and lower the molecular weight. Polyfunctional compounds of component (b) can be incorporated in the finished polymer both at the chain end and in random distribution over the polymer chain.

The crude polymers can be freed from monomeric contents by customary methods of working up, for example by extraction with water and 1 N hydrochloric acid or by membrane filtration. The copolymers are analyzed by $^{13}$C- and $^{15}$N-NMR spectroscopy, FT-IR spectroscopy and, after total hydrolysis, by HPLC, GC and GC-MS.

The modified polymers are preferably prepared from the polysuccinimides by aqueous hydrolysis at 20° C. to 150° C. and pH 7 to 12, if appropriate under pressure. However, this reaction can also be carried out at temperatures outside the stated temperature range and at other pH values. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like. Partially or completely neutralized copolymers which comprise 0.1 to 99.9 mol % of aspartic acid and 99.9 to 0.1 mol % of at least one compound (b) in copolymerized form are obtained.

If primary amines or bases which carry primary amino groups are used for the hydrolysis, the amine salts formed can be converted into the corresponding amides by dehydration. The water can be split off by heat treatment at temperatures of 30° C. to 250° C., if appropriate assisted by vacuum.

The modified polymers according to the invention can be used as an additive in low-phosphate and phosphate-free detergents and cleaning compositions. The polymers are builders for detergents and have the effect of reducing encrustation and graying on washed textile goods during the washing operation.

The modified polymers according to the invention are furthermore suitable as water treatment agents. They can be added to the water in cooling circulations, evaporators or sea-water desalination plants. They can furthermore be employed as agents which prevent deposits during concentration of sugar cane juice.

Because of their good dispersing properties, the modified polymers according to the invention are also suitable as dispersing agents for inorganic pigments and for the preparation of highly concentrated solids dispersions (slurries) of, for example, alkaline earth metal hydroxides, such as, for example, $Ca(OH)_2$ and $Mg(OH)_2$, or also their oxides and carbonates, and as an additive for cement or as a cement liquefier.

In a second embodiment the present invention relates to a process for the preparation of polymers having recurring succinyl units by reaction of A, an unsaturated $C_4$-dicarboxylic acid or a derivative thereof, with B, a nitrogen-donating compound, in a first reaction step to give a reaction mixture, wherein at least 50% of precursor A is reacted with precursor B, the reaction is preferably carried out at not more than 200° C. and the water content is at least 35%, based on the total reaction mixture, and subsequent optionally continuous feeding of the reaction mixture, without intermediate isolation, into an optionally continuously operated reactor, if appropriate via a nozzle, and treatment of the reaction mixture at a temperature of 120° C. to 350° C. to give the polymer having recurring succinyl units.

The polymers thus prepared can be further hydrolyzed by optionally organic and inorganic bases.

The continuous polymerization of aspartic acid, maleic anhydride, maleic acid or fumaric acid in a solvent at 150° C. to 300° C., if appropriate in the presence of ammonia, is described in EP-A 0 613 920. Water, for example, can be employed as the solvent.

The preparation can also be carried out by thermal polycondensation of aspartic acid according to J. Org. Chem. 26, 1084 (1961). The polysuccinimide (PSI) initially occurs as an intermediate stage, and is also called "anhydropolyaspartic acid" in that reference. PSI can be converted into PAA by hydrolysis.

DE 2 029 502 describes the preparation of aspartic acid by thermal rearrangement of the diammonium salt of maleic acid in an aqueous solution. After acidification of the aqueous solution with a strong mineral acid, the aspartic acid is crystallized out. A yield of 61.6% is achieved.

DD 126 075 describes a process for the preparation of DL-aspartic acid by rearrangement of the diammonium salt of maleic acid with the addition of a carboxylic acid amide as a catalyst in an aqueous solution. The DL-aspartic acid is liberated with hydrochloric acid.

A disadvantage of the known processes for the preparation of polyaspartic acids from aspartic acid is the associated expenditure for the preparation and, in particular, isolation of the aspartic acid.

The present invention overcomes these disadvantages.

In a preferred embodiment, the polymerization is carried out at temperatures above 140° C., in particular at 150 to 350° C., particularly preferably at 160° C. to 250° C.

Polymerization of the reaction mixture of A and B comprising aspartic acid without intermediate isolation means that no solid is isolated. If appropriate, the reaction mixture can be concentrated by carrying out the polymerization in suitable reactors.

In a preferred embodiment, maleic anhydride, maleic acid and/or fumaric acid are used as precursor A. They can be employed individually or as a mixture.

Derivatives A of the $C_4$-dicarboxylic acid are, for example, ammonium salts of maleic acid, such as the monoammonium salt and the diammonium salt of maleic acid, or ammonium salts of fumaric acid, such as the monoammonium salt and the diammonium salt of fumaric acid. Derivatives are furthermore salts of maleic acid or fumaric acid, such as, for example, alkali metal salts, above all sodium or potassium salts of maleic acid or fumaric acid.

Preferred compounds B are ammonia or compounds which liberate ammonia, such as ammonium salts and amides of carbonic acid, in particular ammonium bicarbonate, diammonium carbonate or urea, as well as isourea (ammonium cyanate), carbamic acid or ammonium carbamate, and also ammonium salts of mineral acids, for example ammonium phosphates and ammonium sulfates. These precursors can be employed individually or as mixtures in bulk or solution. If ammonia is employed as precursor B, it can also be used in gaseous form.

The mixture obtained in the first reaction step preferably comprises more than 50% of aspartic acid, based on carbon (CH units), or a salt thereof.

The term aspartic acid includes D-aspartic acid and L-aspartic acid, the racemate thereof, DL-aspartic acid and salts thereof, in particular the ammonium salts of aspartic acid, aspartic acid monoammonium salt and aspartic acid diammonium salt.

The reaction mixtures are preferably prepared by reaction of maleic anhydride initially with water to give maleic acid and subsequent reaction with ammonia and ammonia derivatives.

Preferably, an aqueous maleic acid or fumaric acid solution is converted into the mono-ammonium salt or diammonium salt of maleic acid or fumaric acid in a reaction vessel with ammonia or an ammonia-donating compound, in particular with an aqueous ammonia solution. The formation of the ammonium salt is preferably carried out at a temperature between 1 and 150° C., in particular at 20 to 100° C. The molar ratio of maleic acid to ammonia is usually between 1.5 and 25.0, preferably 2.0 to 10, particularly preferably 2.0 to 5.0. Ammonia can be added either in gaseous form or as an aqueous ammonia solution. The weight content of the water of the solution depends of course on the solubility of the organic substances and of the salts of the organic substances. It is expedient to employ a water concentration of 40 to 99.9% by weight, preferably 50 to 99% by weight and especially preferably 60 to 65% by weight.

Precursor A can be brought together with precursor B continuously or discontinuously. This process step is accompanied by evolution of heat, so that it is expedient to cool the reaction solution via a pumped circulation. In a specific embodiment, precursor A and precursor B can be combined by bringing an aqueous solution of precursor A and precursor B, preferably gaseous ammonia or an aqueous ammonia solution, into contact via a nozzle.

All reactors which allow good regulation of the reaction conditions are suitable, in particular, for bringing together precursors A and B. Preferred reactors are all types of stirred tank reactors with or without pumping circulation, stirred tank cascades, loop reactors, tube reactors with recycling, etc. If gaseous ammonia is used, examples of reactors which may be mentioned are: bubble columns, gassed stirred tanks and airlift loop reactors.

In the subsequent process step, the mixture of precursor A and precursor B, which comprises an ammonium salt of maleic acid or of fumaric acid or a mixture of the ammonium salts of the two carboxylic acids, the monoammonium or the diammonium salt or a mixture of mono- and diammonium salt of maleic acid or of fumaric acid being present depending on the amount of ammonia added, is converted into aspartic acid. In addition to the free aspartic acid, the monoammonium or diammonium salt of aspartic acid can be formed, according to the ammonium concentration which remains. The amination of the carboxylic acid is usually carried out at a temperature of 50 to 200° C., preferably between 60 and 180° C., and especially preferably between 70 and 170° C. The pressure is in general 1 to 40 bar, preferably 1 to 16 bar and especially preferably between 1 and 10 bar.

The rate of formation of aspartic acid is determined by the concentrations of the substances present and the temperature at which the reaction is carried out. As a rule the residence time of the amination reaction is 0.5 minute to 48 hours, in particular 0.5 hour to 24 hours.

The amination reaction is expediently carried out in a pressure reactor which can be operated continuously or discontinuously, in particular in a stirred tank autoclave. By connecting several stirred tank reactors in series, flow tube properties can be approximated and influence can additionally be exerted on the residence time. It is also possible to employ other types of reactor, such as tube reactors, loop reactors, stirred tank cascades or stirred tank reactors with and without pumped circulation.

The formation of the aspartic acid can furthermore be carried out with a continuously operated or discontinuously operating process step.

To increase the rate of formation of aspartic acid it is also possible additionally to employ catalysts, such as, for example, salts of all types of metals, in particular copper salts or mercury salts, and furthermore all types of non-metal salts, above all ammonium chloride, sulfate, phosphate or carbonate.

Depending on the design of the amination reactor, the ammonium salt formation and the aspartic acid formation can be combined into one process step and carried out in one reactor.

The reaction solution thus prepared preferably has an aspartic acid content of greater than 50 mol % up to 93 mol %, based on the material amount of organic compounds employed. It is found, surprisingly, that the aspartic acid can already be converted into a polyaspartic acid of good product quality by thermal polycondensation from this crude solution without further working up.

The aspartic acid content of the crude solution can additionally be increased by lowering the pH of the reaction mixture by addition of an acid and subjecting the solution to heat treatment. In a preferred embodiment of this process step, an acid, for example hydrochloric acid, sulfuric acid or phosphoric acid, is added to the reaction mixture and a pH of less than 4.5 is established. This acid solution is heated to a temperature of about 50 to 120° C. in a stirred tank reactor. The residence time of the mixture at this temperature in the reactor is about 0.1 minute to 4 hours, preferably 1 minute to 2 hours. The heat treatment of the reaction solution can also be carried out in other apparatuses, such as, for example, a flow tube. The reaction solution thus prepared has, where appropriate, an aspartic acid content of at least 60 mol %, based on the material amount of organic compounds employed. This solution comprising aspartic acid can be polymerized as described above without further working up.

All apparatuses which provide the necessary minimum residence time for the polymerization, coupled with a narrow residence time distribution of the viscous-liquid phase, and allow the necessary temperature program and at the same time at least partial evaporation of the solvent, in particular of the water, and of the water formed during the reaction are preferably suitable for the subsequent thermal polymerization.

For building up polymer chains of uniform chain length, the thermal polymerization should be carried out as far as possible in a residence time which is the same for all molecules under reaction conditions which are as identical as possible. Suitable reactors having a narrow residence time spectrum are known in the relevant literature (for example Ullmann: Encyclopedia of Industrial Chemistry, 1992, Volume B4, 97–120).

Preferred reactors for the thermal polymerization are thus all apparatuses which have a defined residence time with a narrow residence time distribution for the solid or highly viscous liquid phase and at the same time allow good temperature control by at least partial evaporation of the solvent and/or of the water of reaction formed during the polymerization. Such preferred devices can be, for example;

a) delay tubes, in particular those known from O. Levenspiel "The Chemical Reactor Omnibook", OSO Book Stores Inc. Corrallis Oregon, January 1989, Chapters 3–5 b) high viscosity reactors with movable baffles, preferably a screw or List reactor, such as are described in EP Application 0 612 784 A1.

c) Driers (for example paddle driers or spray driers), preferably such as are described in DE-A-44 25 952.

d) Stirred tank cascades, in particular such as are described in O. Levenspiel "The Chemical Reactor Omnibook", OSO Book Stores Inc. Corrallis Oregon, January 1989, Chapters 3–5.

e) Thin film evaporators, in particular such as are described by W. L. McCase, J. C. Smith, "Unit operations of chemical engineering", McGrace Hill, 2nd edition, 1967, Chapter 16, page 445.

f) High viscosity reactors without movable baffles (for example multi-phase helical tube reactors (MPHR)), in particular such as are described in DT 1 667 051 and DE 219 967.

g) Microwaves, in particular such as are described in U.S. Pat. No. 4,696,971.

Combinations of these devices are possible, too.

Particularly good results are achieved if a tube reactor or an MPHR has been used. These apparatuses have proven particularly suitable for carrying out the process according to the invention.

To control the reactor temperature of the reactions carried out, complete or also partial circulation of the reaction mixture in combination with removal and supply of heat can be effected. All the reactors of the abovementioned construction with recycling of the reaction mixture in combination with removal and supply of heat and all loop reactors are particularly suitable for such a reaction procedure.

In a preferred embodiment, the removal or supply of heat to the reactor is controlled such that the second reaction step can then take place at 120 to 350° C., preferably at 140 to 300° C., and particularly preferably at 120 to 250° C., depending on the nature and concentration of the substances used.

The residence times in the reactor system to be used for the polymerization are preferably up to 120 minutes. Residence times of up to 30 minutes are preferred. Residence times which decrease with increasing temperature are particularly preferred, i.e. less than 30 minutes at temperatures between 120 and 200° C.; less than 10 minutes at temperatures between 200 and 250° C.; less than 5 minutes at temperatures between 250 and 300° C.; and less than 2 minutes at temperatures above 300° C. The residence time is preferably chosen such that practically complete polymerization takes place. The resulting reaction products are hot solutions or solvent-containing or aqueous melts, depending on the water or solvent content, because of the enthalpy of reaction liberated and the removal or supply of heat.

The polymers prepared by the process according to the invention contain recurring succinyl units having at least one of the following structures:

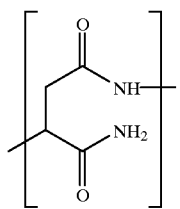

1

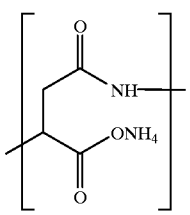

2

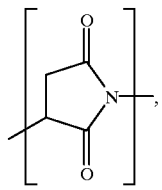

3

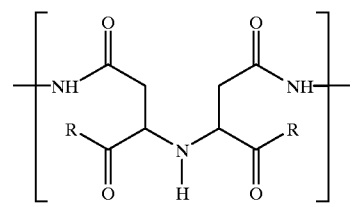

4

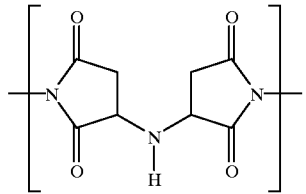

5

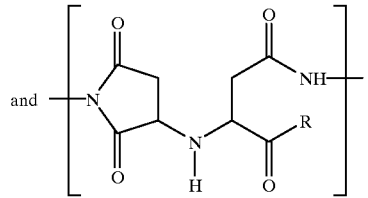

6

R=ONH$_4$, NH$_2$ or the structures 1, 2, 3, 4, 5 and 6.

In general, polymers chiefly contain units 3.

In addition, by a suitable reaction procedure and choice of precursors, the polymers can contain other recurring units, for example a) malic acid units of the formula

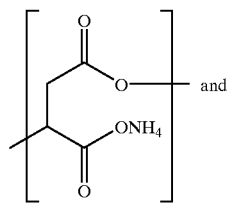

b) maleic acid and fumaric acid units of the formula

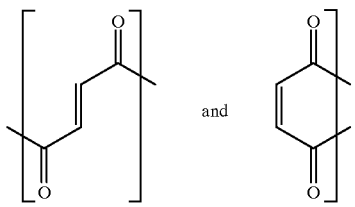

The chemical structure is preferably analyzed by $^{13}C$-NMR, FT-IR and, after total hydrolysis, by HPLC, GC and GC/MS.

According to a further development of the invention, the structure of the resulting polysuccinimide can be influenced by the stoichiometric ratio of the precursors.

Preferably, 1.5 to 25.0, preferably 2.0 to 10.0 mol, particularly preferably 2 to 5 mol, of ammonia are employed here per mole of maleic anhydride.

The polymerization products can be solvolyzed with ring-opening of the recurring succinimide units. The aspartic units contained in the products can be partly or completely hydrolyzed by this operation. A pH of 7 to 12 is preferably chosen here, in particular by addition of a base. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like.

The temperature during the hydrolysis is suitably in a range including up to the boiling point of the PSI suspension and is preferably 20 to 150° C. If appropriate, the hydrolysis is carried out under pressure. A salt is as a rule obtained by this reaction.

The hydrolysis products contain recurring aspartic acid units which, in the form of the free acid, correspond to the following formulae:

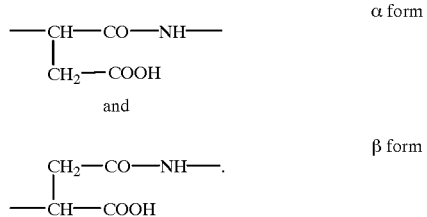

If the polymer is built up completely or essentially from these recurring units, it is thus a polyaspartic acid. The content of the β form is in general more than 50%, preferably more than 70%.

If appropriate, the product is washed with water before the hydrolysis in order to remove low molecular weight polymerization products.

However, it is also possible to obtain free acids by purely aqueous hydrolysis or treatment of the salt with acids or acid ion exchangers.

Different chain lengths or molecular weights can be established, depending on the reaction conditions, for example residence time and temperature of the polymerization. According to analyses by gel permeation chromatography, molecular weights of Mw=500 to 10,000, preferably 700 to 5000, particularly preferably 1000 to 4500, are obtained in particular.

The polymers prepared according to the invention can be used in non-hydrolyzed or, preferably, in hydrolyzed form as an additive in low-phosphate and phosphate-free detergents and cleaning compositions. They are builders for detergents and have the effect of reducing incrustation and graying on the washed textile goods during the washing operation.

The polymers prepared according to the invention are furthermore suitable as water treatment agents. They can be added to the water in cooling circulations, evaporators or sea-water desalination plants. They can furthermore be employed as agents for preventing deposits during concentration of sugar cane juice.

They are furthermore suitable as a dispersing agent, bleaching agent stabilizer and corrosion inhibitor, for dispersing organic and inorganic pigments, as additive in fertilizers and as a grinding auxiliary.

Because of their good dispersing properties, the polymers according to the invention are also suitable as dispersing agents for inorganic pigments and for the preparation of highly concentrated solids dispersions (slurries), such as, for example, of calcium and magnesium carbonates, hydroxides and oxides, and as an additive for cement or as a cement liquefier.

The invention furthermore relates to a process for the preparation of modified polymers in which a) 0.1 to 99.9 mol % of precursors A and B and b) 99.9 to 0.1 mol % of fatty acids, fatty acid amides, polybasic carboxylic acids, anhydrides and amides thereof, polybasic hydroxycarboxylic acids, anhydrides and amides thereof, polyhydroxycarboxylic acids, aminocarboxylic acids, sugar-carboxylic acids, alcohols, polyols, amines, polyamines, alkoxylated alcohols and amines, amino-alcohols, amino-sugars, carbohydrates, ethylenically unsaturated mono- and poly-carboxylic acids and anhydrides and amides thereof, protein hydrolysates, for example maize protein hydrolysate and soya protein hydrolysate, aminosulfonic acids and aminophosphonic acids are reacted by the process according to the invention.

The precursors described under a) are employed in the polymerization according to the invention to the extent of 0.1 to 99.9 mol %, preferably to the extent of 60 to 99.9 mol % and particularly preferably to the extent of 75 to 99.9 mol %.

Possible components (b) of the polymers are all the fatty acids. They can be saturated or ethylenically unsaturated. Examples are formic acid, acetic acid, propionic acid, butyric acid, lauric acid, palmitic acid, stearic acid, oleic acid, linoleic acid, linolenic acid, sorbic acid, myristic acid, undecanoic acid and all the naturally occurring fatty acid mixtures, for example $C_{12}/C_{14}$- or $C_{16}/C_{18}$-fatty acid mixtures. Acrylic acid and methacrylic acid can also be employed as unsaturated fatty acids.

These acids can furthermore also be used in the form of their amides. Polybasic carboxylic acids which can be employed are, for example, oxalic acid, succinic acid, glutaric acid, adipic acid, malonic acid, suberic acid, aconitic acid, itaconic acid, sulfosuccinic acid, alkenylsuccinic acid ($C_1$-$C_{26}$), 1,2,3-propanetricarboxylic acid, butanetetracarboxylic acid, furandicarboxylic acid and pyridinedicarboxylic acid. The anhydrides of polybasic carboxylic acids, for example succinic anhydride, itaconic anhydride, aconitic anhydride and phthalic anhydride, can likewise be used. Possible components (b) are furthermore also polybasic hydroxycarboxylic acids and polyhydroxycarboxylic acids. In addition to at least one hydroxyl group, polybasic hydroxycarboxylic acids carry at least two or more carboxyl groups. Examples which are mentioned here are malic acid, tartaric acid, uvic acid, citric acid and isocitric acid.

In addition to one carboxylic acid group, monobasic polyhydroxycarboxylic acids carry two or more hydroxyl groups, for example glyceric acid, dimethylolpropionic acid, dimethylolbutyric acid and gluconic acid. Monohydric alcohols having, for example, 1 to 22 C atoms, such as, for example, methanol, ethanol, n-propanol, i-propanol, butanol, pentanol, hexanol, octanol, lauryl alcohol, stearyl alcohol and the like are furthermore suitable. The alcohols can also optionally contain a double bond, such as allyl alcohol or oleyl alcohol. These alcohols can furthermore be alkoxylated, for example with ethylene oxide or propylene oxide. The adducts of 30 to 50 mol of ethylene oxide on fatty alcohols or oxo-alcohols are of industrial interest. Polyols which are either saturated or unsaturated can furthermore be employed as component (b), such as, for example, ethylene glycol, propylene glycol, butanediol, butenediol, glycerol, trimethylolpropane, pentaerythritol, sorbitol and neopentylglycol, as well as alkoxylated polyols, such as polyethylene glycols, polypropylene glycols, ethoxylated trimethylolpropane, glycerol or pentaerythritol having molecular weights of up to 6000. Comonomers (b) which are furthermore suitable are also amines, such as $C_1$–$C_{22}$-alkylamines, for example methylamine, ethylamine, propylamine, butylamine, cyclohexylamine, octylamine, isooctylamine (ethylhexylamine), stearylamine, allylamine, oleylamine, ethylenediamine, diethylenetriamine, hexamethylenediamine, piperazine, diaminobutane, dimethylamine, diethylamine, hydroxylamine, hydrazine, ethanolamine, diethanolamine and aminopropanediol, and polyalkyleneamines, such as polyethyleneamine having molecular weights of up to 6000. The amines can also be alkoxylated, for example the addition products of 3 to 30 mol of ethylene oxide on fatty amines, such as oleylamine, palmitylamine or stearylamine. Amino sugars, such as aminosorbitol or chitosamine, are furthermore also suitable. Carbohydrates, such as glucose, sucrose, maltose, dextrose or starch, or sugar-carboxylic acids, for example mucic acid, gluconic acid, glucuronic acid or glucaric acid, are also suitable as component (b). Amino acids, proteinogens, such as glycine, alanine, glutamic acid and lysine, or non-proteinogens, such as 4-aminobutyric acid, diaminosuccinic acid, 11-aminoundecanoic acid and 6-aminocaproic acid, can furthermore be employed as component (b). The compounds of component (b) are employed for the polymerization in amounts of 0.1 to 99.9 mol %, preferably 0.1 to 40 mol %, particularly preferably 0.1 to 25 mol %. It is possible to employ a single compound of component (b) or mixtures of two or more compounds of (b). The compounds of component (b) can be mixed with one of the main precursors (a) in the desired ratio and employed as a mixture in the first reaction stage.

In another embodiment, the compounds of component (b) are added to the reaction mixture when carrying out the second reaction step on entry into the reactor for the thermal polymerization. It is likewise possible to meter in the compounds of component (b) simultaneously with the main precursors (a) in the first reaction step.

If monofunctional compounds such as alcohols, amines, fatty acids or fatty acid amides are used as component (b), they are incorporated at the chain end. They act as chain terminators and lower the molecular weight. Polyfunctional compounds of component b) can be incorporated in the finished polymer both at the chain end and in random distribution over the polymer chain.

The crude polymers can be freed from monomeric contents by customary methods of working up, for example by extraction with water and 1 N hydrochloric acid or by membrane filtration. The copolymers are analyzed by $^{13}$C- and $^{15}$N-NMR spectroscopy, FT-IR spectroscopy and, after total hydrolysis, by HPLC, GC and GC-MS. In the polymerization according to the invention, the polymer is primarily obtained in the form of the usually water-insoluble modified polysuccinimides.

The modified polymers are preferably prepared from the polysuccinimides by aqueous hydrolysis at 20° C. to 150° C. and pH 7 to 12, if appropriate under pressure. However, this reaction can also be carried out at temperatures outside the stated temperature range and at other pH values. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like. Partly or completely neutralized copolymers which comprise 0.1 to 99.9 mol % of aspartic acid and 99.9 to 0.1 mol % of at least one compound (b) in copolymerized form are obtained.

If primary amines or bases which carry primary amino groups are used for the hydrolysis, the amine salts formed can be converted into the corresponding amides by dehydration. The water can be split off by heat treatment at temperatures of 30° C. to 250° C., if appropriate assisted by vacuum.

EXAMPLES

First Embodiment of the Invention

The abbreviations have the following meaning:

MA Maleic acid

PAA Polyaspartic acid

MAA Maleic acid anhydride

Polymers having recurring succinyl units were obtained as follows:

Example 1

First Embodiment 1.1 Preparation of a 74.5% Strength by Weight Maleic Acid $(NH_4)_{1.7}$ Salt Solution 51.7 kg of water are initially introduced into a stirred tank and heated to 60° C. 75.0 kg $\underline{\triangle}$ 0.765 kmol of maleic anhydride are added in portions. The temperature is increased to 80° C. Thereafter, 22.1 kg $\underline{\triangleq}$1.3 kmol of ammonia gas are added. During this operation, the temperature is raised to 100° C. until the end of the metering of the ammonia. 148.8 kg of a 74.5% strength by weight $MA(NH_4)_{1.7}$ salt solution are obtained.

1.2 Heat Treatment of the Solution

The resulting solution is heat-treated at 100° C. for 16 hours.

1.3 Polymerization of the Heat-Treated Solution

The heat-treated solution is pumped at about 21 kg/hour into a heated helical tube of 58 m length and 15 mm cross-section. The polymerization is carried out there at about 190–200° C. During this operation, most of the water of solution and reaction can evaporate.

At the end of the tube, the polymeric crude product is discharged by the flow which forms individually in the helical tube, without forced conveying. The hot crude product is diluted with water in a tank connected to the tube. Analysis shows the following composition, based on carbon ($C_4$ units): total nitrogen (N) 177% of theory.

1.4 Hydrolysis to Give Polyaspartic Acid Na Salt

The amount of sodium hydroxide solution necessary for complete hydrolysis of the carboxyl groups is determined by the hydrolysis number (HN). Peptide bonds are not hydrolyzed by the determination method. The HN for the resulting crude product is 3.08 mmol of NaOH/g of crude product solution.

The hydrolysis is carried out with sodium hydroxide solution at 130° C. under pressure for 3 hours. The ammonia liberated is then distilled off.

1.5 Analysis of the PAA Na Salt Solution

The resulting PAA Na salt solution has a content of 30% of carbon. Determination of the molecular weight by gel permeation chromatography (GPC) gives a weight-average $M_w$ of 1390. Determination of the calcium carbonate dispersing capacity (CCC) at 25° C., pH 11, gives a CCC value of 22 mg of $CaCO_3$/g of PAA Na salt. The ZnO content of an aqueous dispersion of 10 g of ZnO topped up to 200 ml with water shows a value of 67% of theory after 2 hours at a PAA Na salt amount of 20 mg, 74% of theory at 50 mg and 64% of theory when the amount used is 100 mg.

The data show that by polymerization of a heat-treated MA $NH_4$ salt solution which has a heterogeneous composition, a polyaspartic acid Na salt which has dispersing and sequestering properties can be obtained.

Example 2

First Embodiment

The heat-treated solution from Example 1 is again employed for the polymerization in an amount of 21 kg/hour. The reaction temperature in the 58 m helical tube reactor is 200 to 210° C. Analysis of the crude product introduced into water shows the following composition: total N 177% of theory. With an HN of 3.46 mmol of NaOH/g of PAA crude product solution, the hydrolysis is carried out accordingly. The 24% strength by weight PAA Na salt solution shows the following analysis values and properties:

$M_w$ (from GPC)=1690; CCC=35 mg of $CaCO_3$/g of PAA Na salt; ZnO content of an aqueous dispersion at 20° C., pH 9.5=71% of theory if 20 mg of PAA Na salt are used, =76% of theory at 50 mg of PAA Na salt, =78% of theory at 100 mg of PAA Na salt and=73% of theory at 200 mg of PAA Na salt.

Example 3

First Embodiment 3.1 Preparation of a 73.6% Strength Maleic Acid $(NH_4)_{1.3}$ Salt Solution The procedure is as in Example 1.1. 51.7 kg of water, 75 kg of MAA and 16.9 kg of ammonia gas were employed this time. 143.6 kg of solution were obtained.

3.2 Heat Treatment of the Solution

The solution is heat-treated at 100° C. for 5 hours.

3.3 Polymerization of the Heat-Treated Solution

The heat-treated solution is pumped at 20 kg/hour continuously into a heated 58 m helical tube. The polymerization is carried out chiefly (because of the temperature pattern which establishes itself) at temperatures of 185–200° C. The crude product introduced into water shows the following N content: total N=139% of theory.

3.4 Hydrolysis of Polyaspartic Acid Na Salt

The HN for the PAA crude product was 3.22 mmol of NaOH/g. After hydrolysis at 130° C. for 3 hours, the ammonia liberated is distilled off. The virtually odorless solution is analyzed.

3.5 Analysis of the PAA Na Salt Solution

The PAA Na salt solution shows a content of 33% by weight of carbon. Total N=83% of theory. $M_w$ from GPC= 1790; the ZnO content of an aqueous dispersion is 69% of theory, 76% of theory, 78% of theory and 77% of theory when 20, 50, 100 and 200 mg of PAA Na salt are used.

Example 4

First Embodiment 4.1 Preparation of an 80.4% Strength Maleic Acid $(NH_4)_{1.3}$ Salt Solution The procedure is as has been described in Example 1.1. 39.5 kg of water, 75 kg of MAA and 16.9 kg of ammonia gas are employed. 131.4 kg of solution are obtained. The temperature level is raised by 10–15° C. because of the concentrated mode of operation. The ammonium salt is therefore kept in solution at 110–115° C.

4.2 Heat Treatment of the Solution

The solution is heat treated at 110° C. for 1.5 hours.

4.3 Polymerization of the Heat-Treated Solution

At a mass flow of 20 kg/hour, the solution is first heated to 215° C. in a preheater 8 m long. The polymerization is then carried out at temperatures of 145–215° C. in a helical tube 11.5 m long. The crude product introduced into water shows the following N content: total N=131% of theory.

4.4 Hydrolysis to Give the PAA Na Salt

The HN for the PAA crude product solution is 1.96 mmol/g. The hydrolysis is carried out as in the previous examples at 130° C. for 3 hours with subsequent removal of aqueous ammonia by distillation.

4.5 Analysis of the PAA Na Salt Solution

The PAA Na salt solution shows a content of 38% by weight of carbon. Total N=75% of theory. The CCC value is 28 mg of $CaCO_3$/g of PAA Na salt; the ZnO content of an aqueous dispersion is 67% of theory, 73% of theory and 69% of theory when 20, 50 and 100 mg of PAA Na salt are used.

Example 5

First Embodiment

A 73.6% strength by weight MA $(NH_4)_{1.3}$ salt solution is employed for heat treatment at 100° C., as has also already been described in Example 3.1. After heat treatment for 3 hours, this solution is employed for the polymerization at a mass flow of 30 kg/hour. During this operation, the solution is heated to 235° C. in a preheater 8 m long and then polymerized at temperatures of 185–215° C. in a helical tube 21 m long, water being evaporated off. The crude product is introduced into water and shows the following N content: total N=135% of theory. At a hydrolysis number of 1.96 mmol of NaOH/g, the hydrolysis is carried out, as described. The resulting 29% strength PAA Na salt solution shows the following analysis and properties: total N=80% of theory, $M_w$ (from GPC)=1720; CCC=23 mg of $CaCO_3$/g; the ZnO content when 10, 20, 50, 100 and 200 mg of PAA Na salt are used per 10 g of ZnO in an aqueous dispersion (200 ml volume) is 66% of theory, 82% of theory, 83% of theory, 84% of theory and 76% of theory.

Example 6

First Embodiment 6.1 Preparation of a 73.6% Strength Maleic Acid $(NH_4)_{1.3}$ Salt Solution The preparation is carried out as described in Example 3.1.

6.2 Heat Treatment of the Solution

The solution is heat treated at 100° C. for 6 hours. Analysis gives total N=130% of theory.

6.3 Polymerization of the Heat-Treated Solution

At a mass flow of 40 kg/hour, the solution is first heated to 230° C. in a preheater 8 m long. The polymerization is then carried out at temperatures of 170–205° C. in a 21 m helical tube, water being evaporated off from the reaction mixture. Due to some of the water of solution and reaction being evaporated off, the viscosity of the liquid mass increases. However, the flow properties of the reaction mixture are retained. The hot reaction mixture is additionally passed into an extruder heated to 100° C. This is an extruder with self-cleaning twin shafts rotating in the same direction having a cross-section of 59 mm per shaft and a length of 1050 mm (such extruders have already been described in DBP 862 668 of 1944). The power consumption was 6.8 kW at a speed of revolution of 130 rpm. A beige-brown powdery to flaky product was discharged from the extruder. It had the following N content: total N=111% of theory.

6.4 Hydrolysis to Give the PAA Na Salt

The HN of the polysuccinimide is 10.3 mmol of NaOH/g. The hydrolysis is carried out as in the previous examples at 130° C. for 3 hours in an autoclave, aqueous ammonia subsequently being distilled off.

6.5 Analysis of the PAA Na Salt Solution

The PAA Na salt solution shows a content of 31% by weight of carbon ($C_4$ units). Total N=89% of theory, CCC= 15 mg of $CaCO_3$/g of PAA Na salt; the ZnO content of an aqueous dispersion is 64, 74, 76, 77 and 71% of theory if 20, 50, 100, 200 and 300 mg of PAA Na salt are used; $M_w$ (from GPC)=2040.

It is thus demonstrated that a significant build-up of molecular weights was obtained in this example by the use of an extruder. The polymer shows a broad use profile in its dispersing properties. The dispersing action also exists for numerous other pigments (for example titanium oxides and iron oxides), mineral salts (for example calcium carbonate, magnesium carbonate and calcium and magnesium hydroxides and oxides) and ceramic powders.

The determination of the ZnO content of an aqueous dispersion was carried out in accordance with the following instructions:

1 g of the substance to be investigated is dissolved in 100 ml of distilled water. The pH of the sample should be 10 and is to be corrected if necessary by addition of 1 N hydrochloric acid or 1 N sodium hydroxide solution. The sample thus prepared is transferred into a 100 ml volumetric flask and made up to exactly 100 ml of stock solution with distilled water.

10.0 g of ZnO analytical grade (Merck) are initially introduced into a 250 ml mixing cylinder and suspended in 140 to 170 ml of water. The following amounts of stock solution are needed for testing of the activity of the concentrations mentioned:

| | | |
|---|---|---|
| 10 | mg in 1 ml | of stock solution |
| 20 | mg in 2 ml | of stock solution |
| 50 | mg in 5 ml | of stock solution |
| 100 | mg in 10 ml | of stock solution |
| 200 | mg in 20 ml | of stock solution |
| 300 | mg in 30 ml | of stock solution |

The mixture is stirred with an Ultraturrax stirrer at 24,000 $min^{-1}$ for 30 seconds, the stirrer is rinsed off with distilled water and the suspension is made up to 200 ml. The sample suspension pension finished in this way is shaken three times manually and left to stand at room temperature for 3 hours.

An aliquot is then removed with a 5 ml volumetric pipette at the 150 ml mark and transferred to a 50 ml measuring cylinder into which 10 ml of 1 N hydrochloric acid and about 20 ml of water have been initially introduced. After the measuring cylinder has been topped up, an aliquot of 10 ml is removed from this and titrated with 0.1 N EDTA solution against Eriochrome black T at pH 11(ammonium/ammonium chloride buffer).

Evaluation

% of ZnO=V·t·16.27

EXAMPLES

Second Embodiment

1. General instructions for the preparation of solutions comprising aspartic acid with a reaction yield of aspartic acid of >50% of theory, based on the maleic anhydride employed.

Maleic anhydride is metered into an initial amount of water at 60 to 90° C. Ammonia is metered into the maleic acid solution at 60 to 90° C. The maleic acid ammonium salt solution formed is heat-treated at elevated temperature over a defined residence time under a pressure which is established individually. A solution comprising aspartic acid is obtained. Other components are asparagine, iminodisuccinate and condensation products of aspartic acid. The compounds are in the form of acids or salts, depending on the amount of ammonia employed. Such solutions can preferably be used for the preparation of polymers having recurring succinyl units.

TABLE 1

| Specific embodiment examples | | | | | | | |
|---|---|---|---|---|---|---|---|
| Example | [No.] | 1 | 2 | 3 | 4 | 5 | 6 |
| Amounts employed: | | | | | | | |
| Water | [g] | 227 | 227 | 227 | 227 | 681 | 2920 |
| MAA | [g] | 196 | 196 | 196 | 196 | 588 | 203 |
| $NH_3$ | [g] | 102 | 102 | 102 | 102 | 204 | 473 |
| Total | [g] | 525 | 525 | 525 | 525 | 1473 | 3596 |
| Reaction conditions: | | | | | | | |
| Temperature | [° C.] | 100 | 110 | 110 | 120 | 150 | 190 |
| Reaction time | [h] | 48 | 12 | 48 | 24 | 4 | 0.7 |
| Yield: | | | | | | | |
| Aspartic acid | [% of theory] | 57 | 51 | 68 | 55 | 66 | 59 |

2. General instructions for the preparation of polymers having recurring succinyl units using the example of polysuccinimide and hydrolysis to give the resulting polyaspartic acid Na salts.

The solutions comprising aspartic acid are concentrated in vacuo at 60 to 90° C. until a viscous solution or a crystal slurry results. The mixtures obtained are introduced into a polymerization reactor heat-treated at 180° C. The reaction mixtures are polymerized at 20 to 250 mbar and 180° C. for 1.5 hours. The foamed reaction mass is powdered and then subjected to after-polymerization under the same conditions for 1 hour. After the hydrolysis number has been determined, the polysuccinimides obtained are hydrolyzed to polyaspartic acid Na salt with the required amount of sodium hydroxide solution at 100 to 105° C. over 3 to 4 hours. During this operation, the ammonia liberated is distilled off.

The molecular weights (weight-average MW from gel permeation chromatography GPC) and the dispersing power for zinc oxide in an aqueous dispersion at 20° C., pH 9.5, are investigated after the dispersion has stood for a period of 3 hours.

TABLE 2

Specific embodiment examples

| Example | [No.] | 4a | 5a | 6a |
|---|---|---|---|---|
| Amounts employed | | | | |
| Solution | [g] | 90 | 90 | 1000 |
| from example | [No.] | 4 | 5 | 6 |
| Reaction conditions: | | | | |
| Temperature | [° C.] | 180 | 180 | 180 |
| Reaction time | [h] | 2.5 | 2.5 | 2.5 |
| Pressure | [mbar] | <200 | <200 | <200 |
| Product obtained: | | | | |
| Polysuccinimide | [g] | 34 | 36 | 55 |
| Hydrolysis number | | | | |
| HN | [mmol of NaOH/g] | 10.3 | 9.8 | 9.9 |
| Product obtained: | | | | |
| PAA Na salt solution | [g] | 120 | 120 | 190 |
| Content from C | [% by weight] | 34.1 | 35.8 | 34.1 |
| Analyses: | | | | |
| MW | [GPC] | 1730 | 2160 | 1820 |
| ZnO content of an aqueous dispersion as a function of the amount of PAA Na salt/10 g of ZnO | | | | |
| at 50 mg of PAA Na salt | [% of theory] | 73 | 74 | 78 |
| at 100 mg of PAA Na salt | [% of theory] | 78 | 77 | 80 |

The determination of the ZnO content of an aqueous dispersion was carried out in accordance with the following instructions:

1 g of the substance to be investigated is dissolved in 100 ml of distilled water. The pH of the sample should be 10 and is to be corrected if necessary by addition of 1 N hydrochloric acid or 1 N sodium hydroxide solution. The sample thus prepared is transferred into a 100 ml volumetric flask and topped up to exactly 100 ml of stock solution with distilled water.

10.0 g of ZnO analytical grade (Merck) are initially introduced into a 250 ml mixing cylinder and suspended in 140 to 170 ml of water. The following amounts of stock solution are needed for testing of the activity of the concentrations mentioned:

50 mg of dispersing agent in 5 ml of stock solution
100 mg of dispersing agent in 10 ml of stock solution The mixture is stirred with an Ultraturrax stirrer at 24,000 min-1 for 30 seconds, the stirrer is rinsed off with distilled water and the suspension is topped up to 200 ml. The sample suspension finished in this way is shaken three times manually and left to stand at room temperature for 3 hours.

An aliquot is then removed with a 5 ml volumetric pipette at the 150 ml mark and transferred to a 50 ml measuring cylinder into which 10 ml of 1 N hydrochloric acid and about 20 ml of water have been initially introduced. After the measuring cylinder has been topped up, an aliquot of 10 ml is removed from this and titrated with 0.1 N EDTA solution against Eriochrome Black T at pH 11 (ammonium/ammonium chloride buffer).

Evaluation

% of ZnO = $V \cdot t \cdot 16.27$ wherein

V = ml of EDTA solution
E = titer of EDTA solution.

We claim:

1. A process for the preparation of a polymer having recurring succinyl units comprising reaction of A, an unsaturated $C_4$-dicarboxylic acid or a derivative thereof, with B, a nitrogen-donating compound, in a first reaction step which is carried out discontinuously to give a reaction mixture comprising at least one low molecular weight reaction product of A and B and/or a prepolymer of A and B, and subsequent continuous feeding of the reaction mixture into a continuously operating reactor and treatment of the reaction mixture at a temperature of 140 to 350° C. to give the polymer having recurring succinyl units and a molecular weight Mw>1300 in a second reaction step.

2. The process as claimed in claim 1, wherein the polymerization is carried out with removal of water.

3. The process as claimed in claim 1, wherein the resulting product essentially contains recurring succinimide units.

4. The process as claimed in claim 1, wherein the polymer is hydrolyzed to give a polymer having essentially recurring aspartic acid units.

5. The process as claimed in claim 4, wherein the polymer essentially contains recurring units of the following structure or a salt thereof:

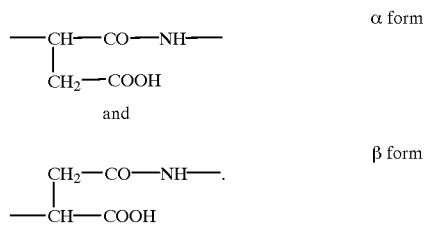

the β-linked contents being present to the extent of more than 50%, based on the sum of α- and β-linked contents.

6. The process as claimed in claim 1, wherein, in the first reaction step, essentially maleic anhydride, maleic acid or a mixture thereof is used as A and essentially ammonia is used as B.

7. The process as claimed in claim 1, wherein the first reaction step is carried out at a temperature between 60 and 250° C. over a residence time of between 1 minute and 20 hours.

8. The process as claimed in claim 1, wherein the polymerization in the second reaction step is carried out at a temperature of 120 to 350° C.

9. The process as claimed in claim 1, wherein the second reaction step is carried out in a tube reactor, a high viscosity reactor, a drier, a stirred tank cascade, a thin film evaporator or a microwave apparatus.

10. The process as claimed in claim 1, wherein the second reaction step is carried out in a multi-phase helical tube.

11. The process as claimed in claim 1, wherein the polymerization in the second reaction step is controlled such that the resulting polymer contains open-chain succinyl units.

12. The process as claimed in claim 1, wherein the polymer obtained in the second reaction step is subsequently subjected to solvolysis.

13. The process as claimed in claim 1, wherein the resulting polymers, where appropriate after hydrolysis, essentially contain recurring aspartic acid units.

14. A method of treating an aqueous system with a polymer wherein a polymer obtained as claimed in claim 1 is used for water treatment, inhibition of precipitates or dispersion by adding the polymer to the aqueous system.

15. A method for dispersing inorganic or organic particles in a non-aqueous system, wherein a polymer obtained as claimed in claim 1 is added to the non-aqueous system.

16. A process for the preparation of a polymer having recurring succinyl units comprising reaction of compound A, an unsaturated $C_4$-dicarboxylic acid or a derivative thereof, with compound B, a nitrogen-donating compound, in water in a first reaction step at a temperature of from 50 to 250° C. to give a reaction mixture wherein the molar ratio of compound A to compound B is 1:1.5–25, and the water content of the reaction mixture is 35 to 95% by weight, based on the total reaction mixture, and further wherein at least 50% of compound A is reacted with compound B in said first reaction step, and subsequent to said first reaction step optionally continuously feeding the reaction mixture, without intermediate isolation, into an optionally continuously operated reactor, water being removed, and treatment of the reaction mixture at a temperature of 140 to 350° C. in the reactor for a residence time of 0.5 minute to 48 hours to give the polymer having recurring succinyl units.

17. The process as claimed in claim 16, wherein the polymerization is carried out with removal of water.

18. The process as claimed in claim 16, wherein the product obtained essentially contains recurring succinimide units.

19. The process as claimed in claim 16, wherein the polymer is hydrolyzed to give a polymer having essentially recurring aspartic acid units.

20. The process as claimed in claim 19, wherein the polymer, in the form of the free acid, contains essentially recurring units of the following structure:

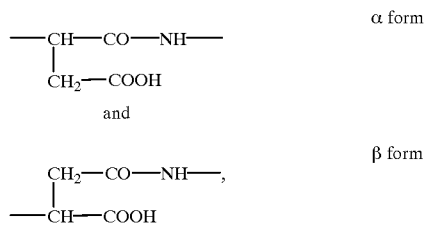

in which the β-linked contents are present to the extent of more than 50%, based on the sum of α- and β-linked contents.

21. The process as claimed in claim 16, wherein, in the first reaction step, essentially maleic anhydride, maleic acid or a mixture thereof is used as compound A and essentially ammonia is used as compound B.

22. The process as claimed in claim 16, wherein the first reaction step is carried out at a temperature between 60 and 250° C. over a residence time of between 0.5 minute and 48 hours.

23. The process as claimed in claim 16, wherein the polymerization is carried out at a temperature of 120 to 350° C.

24. The process as claimed in claim 16, wherein the first reaction step is carried out in a stirred tank reactor.

25. The process as claimed in claim 16, wherein the polymerization is carried out in a tube reactor, high-viscosity reactor, drier, stirred tank cascade, thin film evaporator, high-viscosity reactor without movable baffles or a microwave apparatus.

26. The process as claimed in claim 16, wherein the polymerization is carried out in a multiphase helical tube.

27. The process as claimed in claim 16, wherein the mixture obtained in the first reaction step comprises more than 50% of aspartic acid, based on the CH units.

28. The process as claimed in claim 16, wherein the polymer obtained is subsequently subjected to hydrolysis.

29. A method of using a polymer obtained as claimed in claim 16 in an aqueous system, in particular for water treatment, inhibition of precipitates or for dispersing wherein said polymer is added to the aqueous system.

30. A method of using a polymer obtained as claimed in claim 16 for dispersing inorganic or organic particles in a non-aqueous system, wherein said polymer is added to said non-aqueous system.

31. The process as claimed in claim 1, wherein the first reaction step is carried out at a temperature between 80 and 150° C. over a residence time of between 1 minute and 20 hours.

32. The process as claimed in claim 1, wherein the polymerization in the second reaction step is carried out at a temperature of 140 to 270° C.

33. The process as claimed in claim 1, wherein the polymer obtained in the second reaction step is subsequently subjected to hydrolysis.

34. The process as claimed in claim 16, wherein the first reaction step is carried out at a temperature between 80 and 150° C. over a residence time of between 0.5 minute and 48 hours.

35. The process as claimed in claim 16, wherein the first reaction step is carried out at a temperature between 60 and 250° C. over a residence time of between 0.5 hour and 24 hours.

36. The process as claimed in claim 16, wherein the first reaction step is carried out at a temperature between 80 and 150° C. over a residence time of between 0.5 hour and 24 hours.

37. The process as claimed in claim 16, wherein the polymerization is carried out at a temperature of 140 to 250° C.

38. A polymer having recurring succinyl units and a molecular weight $M_w$ of from 1300 to 10,000, wherein said recurring succinyl units are selected from the group consisting of

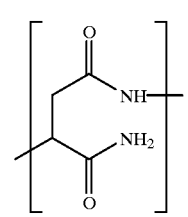

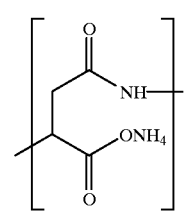

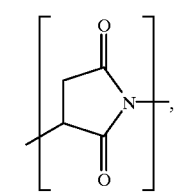

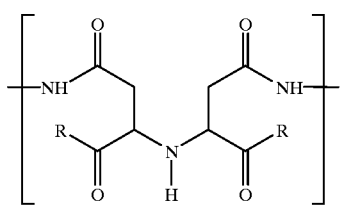
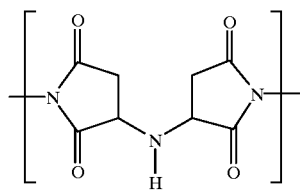
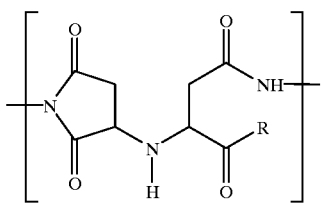
where R=ONH$_4$, NH$_2$ or one of the structures 1, 2, 3, 4, 5 or 6.
* * * * *